April 2, 1963

J. DESPRES 3,083,405

PROCESS AND APPARATUS FOR THE MANUFACTURE OF FIBRES FROM
FUSIBLE MINERAL MATERIALS, MORE PARTICULARLY
GLASS AND ITS DERIVATIVES

Filed Sept. 25, 1959

Inventor:
Justin despres
by:
Michael S. Striker
Attorney

April 2, 1963

J. DESPRES 3,083,405

PROCESS AND APPARATUS FOR THE MANUFACTURE OF FIBRES FROM FUSIBLE MINERAL MATERIALS, MORE PARTICULARLY GLASS AND ITS DERIVATIVES

Filed Sept. 25, 1959

Inventor:
Justin despres
by:
Michael S. Striker
Atty

United States Patent Office 3,083,405
Patented Apr. 2, 1963

3,083,405
PROCESS AND APPARATUS FOR THE MANUFACTURE OF FIBRES FROM FUSIBLE MINERAL MATERIALS, MORE PARTICULARLY GLASS AND ITS DERIVATIVES
Justin Desprès, Avignon Saint-Jean, France, assignor of one-half to Heinz Erich Sommer, Frankfurt am Main, Germany
Filed Sept. 25, 1959, Ser. No. 842,506
Claims priority, application France Oct. 3, 1958
12 Claims. (Cl. 18—2.5)

This invention relates to a process and apparatus for the manufacture of fibres from fusible mineral materials, more particularly glass and its derivatives. The known processes directed to the same object may be summarised as follows:

(a) Disintegration into fibres of a stream of glass or the like as it falls freely from a furnace by means of compressed air or steam at high pressure.

(b) Heating of a glass rod, followed by its disintegration into fibres by a suitably directed blowpipe flame.

(c) Agglomeration of a basic composition with a binder and extrusion by machine into rod formation sufficiently rigid to be operated upon by a suitably directed blowpipe flame.

(d) Formation of fine fibres by the extrusion of a mineral material under high pressure through micrometric grooves formed between two heated metal blocks.

(e) Manufacture of fibres by causing a stream of molten mineral material as it leaves a furnace to fall onto a disc revolving at high speed.

(f) Manufacture of fibres by causing a stream of mineral material as it leaves a furnace to fall into the centre of a revolving spinneret, having peripheral calibrated orifices, through which the material is projected by centrifugal force in the form of fibres.

Some of these processes have given fairly good results in practice, but in every case production is low, the fibre obtained is sometimes irregular, and the staples produced are short, especially those made in revolving spinneret apparatus.

The process according to the present invention makes it possible to produce long fibres which lend themselves well to weaving; the fineness of the fibres can be varied by operating on the various components of the apparatus.

The accompanying drawings show by way of example, which is not restrictive, one embodiment of the present invention.

Figure 1:
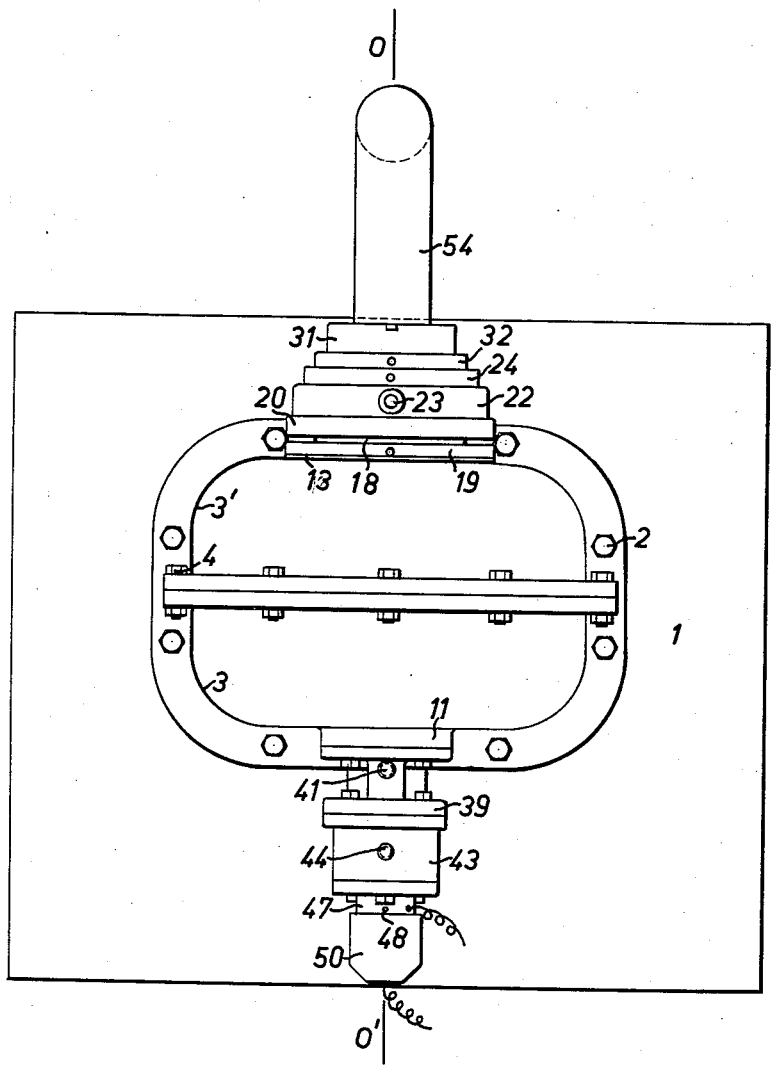
FIGURE 1 is a front view showing the general exterior configuration of the apparatus.
Figure 2:
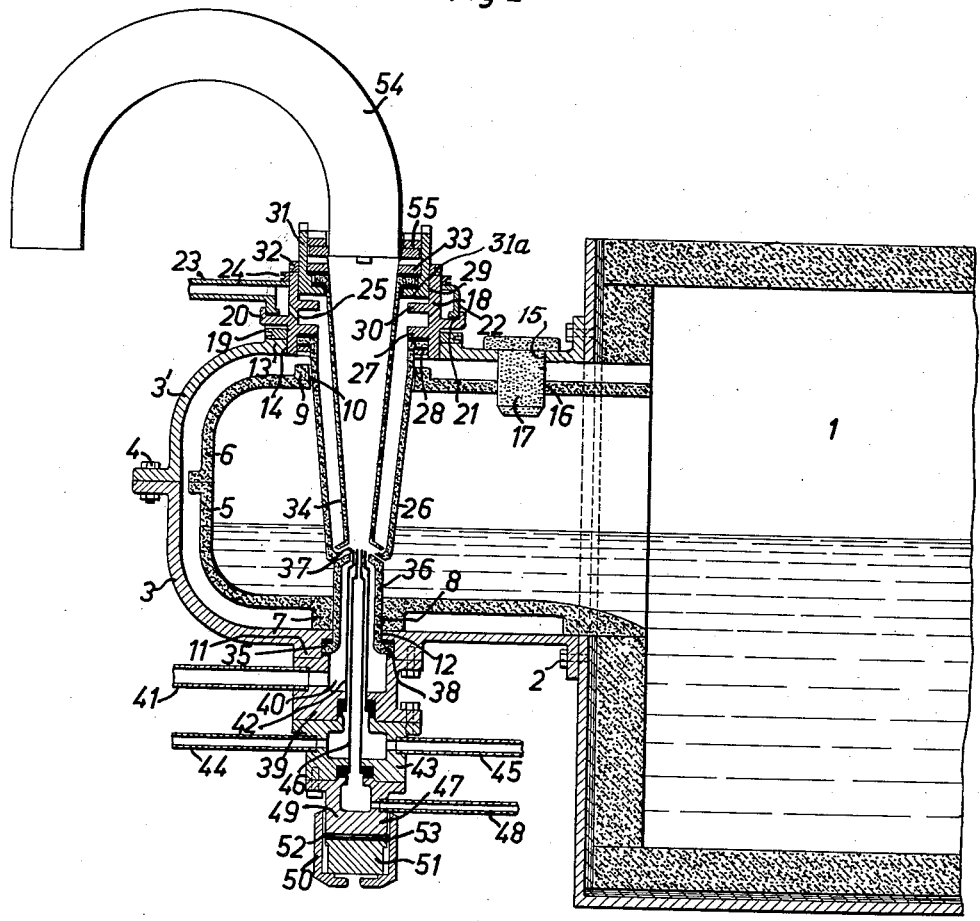
FIGURE 2 is a longitudinal section of the apparatus taken along the line O—O¹ of FIGURE 1.

Refering to the drawing, 1 is a source of molten fusible material here shown as a melting or refining tank to which is secured by screws 2 or by any other suitable means a metal casing or box comprising two parts 3 and 3¹ assembled together by bolts 4; the metal box contains a reservoir 5 (of refractory material) which communicates directly with the tank 1 and in which a predetermined level of molten material is established. A cover 6, likewise of refractory material, is fitted on the reservoir 5. The reservoir 5 has a flange 7 by means of which it rests on the internal lower face of the box 3 so that the reservoir and the box define between themselves a gap which may be filled with insulating material, such as magnesia, kieselguhr, etc. The flange 7 has an orifice 8. The cover 6 likewise has a flange 9 and an orifice 10.

The lower part 3 of the metal box, axially of the line of projection of the fibres, has a lower flange 11 which is formed with an orifice 12. The upper part 3¹ of the box likewise is provided with a flange 13 having an orifice 14.

The orifices 8, 10, 12, 14 must be accurately concentric to insure satisfactory centering of the various components of the apparatus.

The rear portion of the upper part 3¹ of the box is formed with an orifice 15 which is aligned with another orifice 16 formed in the upper part of the cover 6, these two orifices being closed by a single stopper 17 of refractory material.

The orifice 14 receives a hollow sleeve 18 whose lower part is externally screw-threaded and meshes with a nut 19, the later provided on its periphery with a number of holes for adjusting engagement with a key; the nut supports the entire upper part of the apparatus and enables an operator to regulate and to arrest the flow of fusible material.

The central part of the hollow sleeve 18 has an external flanged collar 20, on which, after insertion of a sealing ring 21, is fitted a hood or cup 22 provided with a supply pipe 23 opening into the interior of said cup. A nut 24 is screwed on an external screwthread provided on the upper part of the sleeve 18 to insure that the hood 22 is maintained in position in a fluid-tight manner.

A series of orifices 25 extending through the walls of the sleeve 18 provide communication between the interior of the hood 22 and the interior of the sleeve 18.

The hollow sleeve 18 is formed with a bore for centering a deflecting obturator tube 26 of refractory material having a high heat resistance. An upper flange of the tube 26, after insertion of suitable sealing joints, is locked against an internal stop 27 by means of a slotted nut 28 which latter meshes with the internally threaded lower part of said sleeve 18.

The upper part of the sleeve 18 has a bore 29 and comprises an internal stop flange 30; slidably received in said bore 29 is a sleeve 31 which is provided with an internal flange 31a and with an external screwthread on which is screwed a nut 32 serving to support and to adjust the height of the sleeve 31 in the sleeve 18.

Locked on the flange 31a of said sleeve 31 by a slotted nut 33 meshing with an internal thread provided on the sleeve 31 is the base flange of a venturi 34, sealing joints being provided at both sides of the flange of the venturi 34.

A boss 11 of the lower part 3 of the metal casing has a shouldered recess 35 which is concentric with its orifice 12 and which centers a disintegrating nozzle 36 formed with a central orifice 37 at its tip and with a flange 38 at the bottom, said flange being provided at each of its sides with suitable sealing joints and being pressed into the recess 35 by a central projection forming part of a compressed air or steam supply chest 39, the latter fixed to the boss 11 by screws or any other suitable means.

The interior of the air or steam supply chest 39 forms a pressure chamber 40, supplied by a feed pipe 41 screwed into said chest and connected to a source of steam or air.

The disintegrating nozzle 36 is formed as a jacket of a material having a high heat resistance, such as zirconia, sintered alumina, sillimanite, etc., and its upper part is shaped or sloped in such a way as to mate with that of the lower part of the deflecting obturator 26 and of the venturi inlet; the various slopes, as well as the transition slope between the bore of the nozzle 36 and the central orifice 37 of the latter are of exactly the identical dimensions as determined by venturi 34.

The central lower part of the chest 39 has a bore followed by a shouldered recess seating a second nozzle 42 which may constitute a burner and which by reason of the intense flow of the surroundings may be made of a copper or nickel tube; at its upper part, the nozzle is constricted to leave a circular passage for the compressed air or steam issuing from the orifice 37 of the disintegrating nozzle 36.

The nozzle 42 at its lower part likewise has integral therewith a flange which after positioning sealing joints at both sides thereof, is secured in a recess in the underside of the air or steam supply chest 39 by the entry into said recess of a central projection on the upper side of a mixing chamber 43, fixed to the air or steam supply chest 39 by suitable screws or other means.

The mixing chamber 43 is supplied by two pipelines 44 and 45, the pipeline 44 supplying either compressed air or oxygen and the pipeline 45 a combustible gas. It is advantageous if the inlets for the different fluids into the mixing chamber are tangentially arranged so that agitation of the different fluids ensures a homogeneous mixture.

The mixing chamber 43 has at its lower central part an orifice for the passage of a third and central nozzle 46 of a construction similar to that of the tubular burner 42 but longer and of smaller diameter; the nozzle 46 also has a lower flange, which is similarly secured, after insertion of sealing joints along both sides thereof, in a recess in the base of the mixing chamber 43 by an extension on the flange of a water or steam chest 47 secured to the mixing chamber 43 by screws or by any other suitable means.

The water or steam chamber 47 likewise has a central chamber fed by a supply pipeline 48 opening into said chamber.

The position of the various nozzles when they are assembled and mounted is such that they all extend into the same horizontal plane with the outer edge of the orifice 37 of the nozzle 36.

The lower part of the water or steam chamber 47 comprises a solid metal mass 49 provided with an external screwthread for receiving a screw-cap 50 serving as guide for a second metal mass 51, the latter formed with a flange 52 for positioning a piezoelectric quartz 53 forming with the two metal masses 49 and 51 a piezoelectric quartz triplet for transmitting ultrasonic vibrations produced by a high-frequency oscillating current. Any suitable source of ultrasonics may be employed.

Instead of containing steam, the central nozzle may contain water, which may be maintained at a suitable level therein by means of a constant level tank, so that by the effect of the suction set up by the escaping air, steam or gas, this water is aspirated in the same way as petrol is aspirated through the jet of a carburetor; the water, particularly when the nozzle 42 is used as a burner, contributes its hydrogen to the flame and increases the intensity of the latter.

Independently of any operation of the burner, it is equally possible, if desired, without any modification other than that of the diameter of the outlet orifice to vaporize by the central nozzle any product capable of modifying the structure of the fibres or of treating them preparatory to their subsequent use, for example greasing products, products for rendering the fibres hydrophile, etc.

Of course, the different pipelines for supplying the apparatus with compressed air, various gases or steam are provided with valves or cocks, pressure gauges, pressure reducers, etc. wherever necessary; such fittings have nothing to do with the invention and, therefore, are not shown in the drawings.

The apparatus may be used either alone or as an element of a battery or similar apparatus.

The fibres produced by the apparatus are collected by means of a curved discharge tube 54, a flange thereon being clamped, with or without insertion of sealing joints, between the slotted nuts 33 and 55 both in screw-threaded engagement with the interior of the sleeve 31; the curved tube 54 directs the fibres to the next treating or processing station. If the apparatus is an element of a battery or similar apparatus, the several curved tubes may be connected to a horizontal manifold in which an air current is set up to convey the fibres in a predetermined direction.

When the apparatus is inoperative, the deflecting obturator 26 rests on the upper face of the disintegrating nozzle 36 and shuts off the supply of fusible material. All that is necessary to unscrew the nut 19 of the sleeve 18 which then falls by its own weight and entrains the deflecting obturator 26.

When starting up the apparatus, the valve controlling the supply of air or steam through the pipe 41 to the pressure chamber 40 is opened so that the fluid enters the disintegrating nozzle 36 and escapes through the orifice 37; this orifice is annular, due to the presence of the tubular burner 42 centrally thereof.

When this operation is completed, the molten mineral material is admitted by manipulating the nut 19 by means of a tommy bar or a suitable wrench to raise the sleeve 18 and the deflecting obturator 26; the molten mineral material is then free to pass between the upper face of the nozzle 36 and the lower face of the deflecting obturator 26, the mating faces of which are identical.

The level of the fusible material being higher than the level of the discharge end of the nozzle 36, a static pressure is exerted on the material surrounding this nozzle and the material is compelled to enter radially towards the centre of the disintegrating nozzle 36. However, the material entering through the gap between the nozzle 36 and the tube 26 cannot rise to the level of material in the reservoir because the disintegrating gas issuing from the nozzle 36 creates vacuum in the venturi 34 which sucks a stream of air through the pipe 23. The air is diffused in the inverted cup 22 and after passing through the orifices 25, enters in the form of numerous jets into the interior of the sleeve 18; the air jets expand and are heated and distributed in the space between the external wall of the venturi 34 and the internal wall of the deflecting obturator 26. The air is finally aspirated in the form of an annular stream between the internal circular flange at the base of the deflecting obturator and the external circular flange at the conical lower end of the venturi. The rate of flow of the induced stream of air may be regulated by modifying the height of the venturi by means of the nut 32.

The induced stream of air, the pressure of which is fairly strong, not only prevents the mineral material from coming into contact with the lower cone of the venturi, but also promotes the flow of said material to the centre of the disintegrating nozzle and flattens the material into the form of a film and applies it against the upper face of the nozzle where it is disintegrated into long and fine fibres when the film meets the high velocity stream or jet of distintegrating gas issuing from the central orifice of the nozzle.

The fibres leaving the venturi are collected by the curved tube 54, which conveys them to the next processing station.

The principle of the apparatus makes it possible to modify at will the size of the fibres by making use of the following factors:

(a) The temperature of the fusible material.
(b) The rate at which the material is admitted between the tube 26 and nozzle 36.
(c) The pressure of the disintegrating jet.
(d) The pressure of the induced air, which may also be pulsed compressed air or hot gases.
(e) By the addition of the tubular burner which draws out the fibres by the flame, and the pressure of which may be varied if necessary.

When the apparatus has been started up and is delivering fibres, the ultrasonic device is put into operation, this being intended to modify the structure of the fibres by subjecting the latter, until they have been completely cooled, to oscillations of low amplitude but high frequency, which makes the fibres wavy and undulated, and more apt to cling to each other.

Detail modifications may be made in the apparatus without departing from the scope of the invention as defined in the appended claims. For example, the apparatus may be adapted and arranged for operation in any position; it may likewise be adapted to operate by suction by connecting the discharge tube 54 to a vacuum pump. In such a hypothetical case, the use of pulsed or compressed air or other gas introduced through the supply pipe 23, opening into the hood 22 is not feasible, and it will be necessary to rely on air or gases introduced by induction under the effect of the suction created in the venturi 34 by aspiration. The flow of air or gas may be regulated to any desired value.

The vertical adjustment of the different parts of the apparatus may comprise inclined planes instead of the nuts 19 and 32, the deflecting obturator 26 may be fixed at a predetermined height and the passage of fusible material adjusted by raising or lowering the nozzle 36; it is likewise possible to reverse the order of the fluid inlets; the nozzle 36 could quite well constitute a tubular burner for drawing out and disintegrating the mineral material by flame. For this purpose, it will suffice to provide a gas supply tube on the supply chest 39, etc. These modifications do not depart from the scope of the present invention.

What I claim and desire to secure by Letters Patent is:

1. A process for the production of long undulated fibres from a fusible material, particularly glass and its derivatives, said process comprising establishing a melt of fusible material; establishing a high-velocity first stream of a gas in a given direction; establishing an annular second stream of a gas about and in substantially the same direction as the first stream; and introducing between said streams an annular film of fusible material from the melt whereby the streams transform the film into fibres.

2. A process for the production of long fibres from a fusible material, particularly glass and its derivatives, said process comprising establishing a melt of fusible material; establishing a high-velocity stream of compressed gas in a given direction; establishing an annular stream of aspirated gas about and in substantially the same direction as said first mentioned stream; and continuously introducing between said streams an annular film of fusible material from the melt whereby the streams entrain and transform the film into fibres.

3. A process for the production of long fibres of variable fineness from a fusible material, particularly glass and its derivatives, said process comprising establishing a melt of fusible material; establishing a high-velocity first stream of a gas in a given direction; establishing an annular second stream of a gas in surrounding relationship about and in the same direction as the first stream; continuosuly introducing between said streams an annular film of fusible material from the melt whereby the streams transform the film into fibres; and varying the thickness of the film.

4. A process for the production of long fibres from a fusible material, particularly glass and its derivatives, said process comprising establishing a melt of fusible material; establishing a flame at the discharge end of a nozzle located below the level of the melt; establishing a high-velocity first stream of a gas about the flame in the direction in which the flame extends from the nozzle; establishing a second stream of a gas annularly about and in the same direction as said first stream; and introducing by gravity flow between said streams an annular film of fusible material from the melt substantially at the level of the discharge end of the nozzle whereby the flame and said streams transform the annular film into long fibres.

5. A process for the production of fibres from a fusible material, particularly glass and its derivatives, said process comprising establishing a melt of fusible material; establishing a high-velocity gaseous stream within a vessel; establishing a second gaseous stream about said first mentioned stream between said vessel and said first mentioned stream; and introducing a film of molten fusible material from said melt between said streams whereby the film is disintegrated into fibres and is carried along in fibrous state in said vessel and said second stream prevents adherence of fusible material to the vessel at least during the disintegration thereof, said second stream moving in the same direction as said first mentioned stream.

6. An apparatus for the production of long fibres from a fusible material, particularly glass and its derivatives, said apparatus comprising, in combination, a source of molten fusible material; nozzle means at least partially immersed in and having discharge orifice means beneath the level of said molten fusible material; tubular means extending into the proximity of said discharge orifice means and defining with said nozzle means a gap for the flow of a film of fusible material toward said orifice means; a venturi mounted in said tubular means and having an open end adjacent to said discharge orifice means; means for introducing a first gas into said tubular means whereby the first gas flows between said venturi and said tubular means toward the open end of said venturi; and means for introducing a compressed second gas into said nozzle means whereby the second gas flows through said orifice means counter to the flow of the first gas in said tubular means and draws the first gas into said venturi about the film of fusible material so that the two gases advance in the same direction and disintegrate said film of fusible material into long fibres which are entrained through said venturi, said first gas preventing said film from coming into contact with the venturi.

7. An apparatus for the production of long fibres from a fusible material, particularly glass and its derivatives, said apparatus comprising, in combination, a source of molten fusible material; first nozzle means at least partially immersed in and having discharge orifice means beneath the level of said molten fusible material; second nozzle means substantially concentrically received within said first nozzle means and having discharge orifice means disposed within said first mentioned orifice means; third nozzle means substantially concentrically received within said second nozzle means and having discharge orifice means disposed within the orifice means of said second nozzle means; tubular means extending into the proximity of said first mentioned discharge orifice means and defining with said first nozzle means a gap for the gravity flow of a film of fusible material toward said first mentioned orifice means; a venturi mounted in said tubular means and having an open end adjacent to said first mentioned orifice means; means for introducing a first gas into said tubular means whereby the first gas flows between said venturi and said tubular means toward the open end of said venturi; means for introducing a compressed second gas into said first nozzle means whereby the second gas flow through said first mentioned orifice means counter to the flow of the first gas in said tubular means and draws the first gas into said venturi about the film of fusible material so that the two gases advance in the same direction and disintegrate the film of fusible material into long fibres which are entrained through said venturi, said first gas preventing said film from coming into contact with the venturi; means for introducing a combustible fuel-air mixture into said second nozzle means whereby said mixture flows through the orifice means of said second nozzle means and is ignited to form a flame within said second gas; and means for introducing a hydrogen-containing fluid into said third nozzle means whereby said hydrogen-containing fluid flows through the nozzle means of said third nozzle means to contribute hydrogen to and to increase the intensity of said flame.

8. An apparatus for the production of long fibres from a fusible material, particularly glass and its derivatives, said apparatus comprising, in combination, a source of molten fusible material; first nozzle means at least partially immersed in and having discharge orifice means beneath the level of said molten fusible material; second nozzle means substantially concentrically received within said first nozzle means and having discharge orifice means disposed within said first mentioned orifice means; tubular means extending into the proximity of said first mentioned discharge orifice means and defining with said first nozzle means a gap for the gravity flow of a film of fusible material toward said first mentioned orifice means; a venturi mounted in said tubular means and having an open end adjacent to said first mentioned orifice means; means for introducing a first gas into said tubular means whereby the first gas flows between said venturi and said tubular means toward the open end of said venturi; means for introducing a compressed second gas into said first nozzle means whereby the second gas flows through said first mentioned orifice means counter to the flow of the first gas in said tubular means and draws the first gas into said venturi about the film of fusible material so that the two gases advance in the same direction and disintegrate the film of fusible material into long fibres which are entrained through said venturi, said first gas preventing said film from coming into contact with the venturi; and means for introducing a combustible fuel-air mixture into said second nozzle means whereby said mixture flows through the orifice means of said second nozzle means and is ignited to form a flame within said second gas.

9. An apparatus for the production of long fibres from a fusible material, particularly glass and its derivatives, said apparatus comprising, in combination, a source of molten fusible material; nozzle means at least partially immersed in and having discharge orifice means beneath the level of said molten fusible material; tubular means extending into the proximity of said discharge orifice means and defining with said nozzle means a gap for the flow of a film of fusible material toward said orifice means; a venturi mounted in said tubular means and having an open end adjacent to said discharge orifice means; means for introducing a first gas into said tubular means whereby the first gas flows between said venturi and said tubular means toward the open end of said venturi; means for introducing a compressed second gas into said nozzle means whereby the second gas flows through said orifice means counter to the flow of the first gas in said tubular means and draws the first gas into said venturi about the film of fusible material so that the two gases advance in the same direction and disintegrate said film of fusible material into long fibres which are entrained through said venturi, said first gas preventing said film from coming into contact with the venturi; and means for transmitting ultrasonic vibrations to one of said gases to undulate the fibres in said venturi.

10. An apparatus for the production of long fibres from a fusible material, particularly glass and its derivatives, said apparatus comprising, in combination, a source of molten fusible material; nozzle means at least partially immersed in and having discharge orifice means beneath the level of said molten fusible material; tubular means extending into the proximity of said discharge orifice means and defining with said nozzle means a gap for the flow of a film of fusible material toward said orifice means; a venturi mounted in said tubular means and having an open end adjacent to said discharge orifice means; means for introducing a first gas into said tubular means whereby the first gas flows between said venturi and said tubular means toward the open end of said venturi; means for introducing a compressed second gas into said nozzle means whereby the second gas flows through said orifice means counter to the flow of the first gas in said tubular means and draws the first gas into said venturi about the film of fusible material so that the two gases advance in the same direction and disintegrate said film of fusible material into long fibres which are entrained through said venturi, said first gas preventing said film from coming into contact with the venturi; and means for transmitting ultrasonic vibrations to said second gas and for thereby undulating the fibres in said venturi, said last mentioned means comprising a piezoelectric quartz assembly including a first metallic mass connected with said nozzle means, a second metallic mass, a quartz element disposed between said first and second metallic masses, and means for maintaining said quartz element in engagement with said first and second metallic masses.

11. A process as set forth in claim 1, including the step of producing vibrations in one of said streams so that the fibres assume as undulate shape.

12. A process as set forth in claim 1, including the steps of cooling the fibres and of subjecting one of said streams and the fibres to the action of a high-frequency electric current of low amplitude so that the fibres are vibrated by such current during the formation and during cooling thereof and assume an undulate shape.

References Cited in the file of this patent

UNITED STATES PATENTS

| | | |
|---|---|---|
| 1,718,334 | Crowley | June 25, 1929 |
| 1,950,932 | Schott | Mar. 13, 1934 |
| 2,006,891 | Hegmann | July 2, 1935 |
| 2,048,651 | Norton | July 21, 1936 |
| 2,072,375 | McCallum | Mar. 2, 1937 |
| 2,121,802 | Kleist | June 28, 1938 |
| 2,255,227 | Parsons | Sept. 9, 1941 |
| 2,577,204 | McElroy | Dec. 4, 1951 |
| 2,578,100 | Stalego | Dec. 11, 1951 |
| 2,578,101 | Stalego | Dec. 11, 1951 |
| 2,582,561 | Peyches | Jan. 15, 1952 |
| 2,588,690 | Archibald | Mar. 11, 1952 |
| 2,663,903 | Stalego | Dec. 29, 1953 |
| 2,800,682 | Dooley | July 30, 1957 |
| 2,814,832 | Stephens | Dec. 3, 1957 |
| 2,847,704 | Scheers | Aug. 19, 1958 |
| 2,980,953 | Graybeal | Apr. 25, 1961 |